Aug. 21, 1962   G. LENGYEL   3,050,313
EXPANDIBLE COLLET FOR GRIPPING WORK PIECES
Filed March 18, 1960
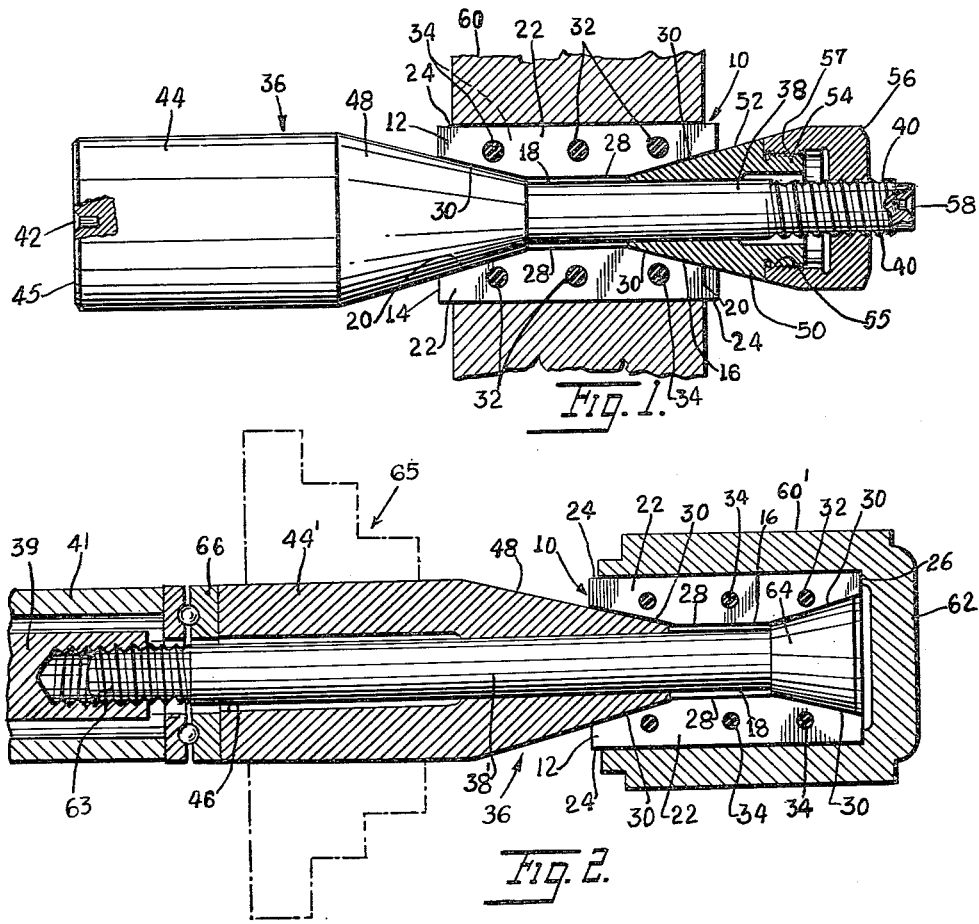
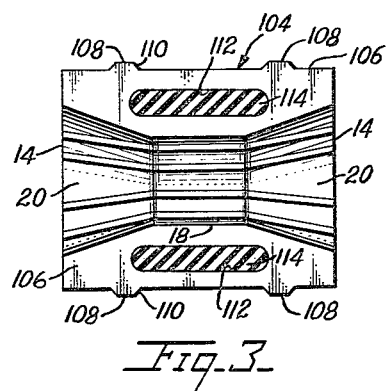
INVENTOR.
GUSTAV LENGYEL
BY
ATTORNEY

United States Patent Office 3,050,313
Patented Aug. 21, 1962

3,050,313
EXPANDIBLE COLLET FOR GRIPPING WORK
PIECES
Gusztav Lengyel, 408 S. Pacific Drive, Fullerton, Calif.
Filed Mar. 18, 1960, Ser. No. 15,966
1 Claim. (Cl. 279—2)

This invention relates to collets for chucks and, more particularly, an an expandible collet for gripping work pieces having cylindrical bores.

A principal object of the invention is to provide an improved collet with angularly spaced gripping members interconnected by resilient material for maintaining the gripping members in desired relative positions but permitting them to be displaced outwardly and inwardly.

Another object of the invention is to provide a collet of this kind which is adjustable over the entire range of sizes within the chuck capacity to avoid the necessity of providing several collets for a given chuck.

Still another object is to provide a collet which will clamp the work with equal pressure by all of a plurality of jaws when clamping pressure is applied to the collet.

A further object is to provide an expandible collet with means for preventing entrance of foreign matter beneath the gripping members.

It is also proposed to provide an expandible collet that has great gripping capacity and is highly efficient for the purpose intended.

It is also an object to provide a stretchable collet that is simple and durable in construction and that can be manufactured and sold at a reasonable cost.

For a further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a part elevational and part sectional view of a tool chuck embodying one form of improved collet, the chuck being shown in closed position holding one type of work piece, parts being broken away.

FIG. 2 is a similar view with the collet of FIG. 1 holding a different type of work piece, a pulley being shown in dot-dash lines.

FIG. 3 is a vertical sectional view of a modified form of collet.

Referring in detail to the drawings, a collet made in accordance with the first form of the invention is shown and designated generally by the reference numeral 10. This collet comprises a body 12 of cylindrical configuration with straight flat ends 14. The body is formed with an axial bore 16, the wall of which midway its ends is straight for a considerable length as indicated at 18 and is conical from each end of the straight portion 18 outwardly to the adjacent end 14 as indicated at 20.

The body 12 includes a series of spaced plates constituting jaws 22. The jaws 22 are flat steel plates but at the preparing of the soft work pieces the jaws would be soft metal such as bronze, aluminum, or of plastic material, such as Bakelite and the like with outer peripheral gripping edges 24 and with end edges 26 at an angle to the gripping edges 24. The inner edges are shaped to complement the shape of the bore 16 of the body 12, said inner edges having straight middle portions 28 parallel to the outer edges 24 and inclined or conical end portions 30 in order to extend to a conical cam surface of a chuck. The plates are preferably provided with transverse openings 32.

The body 12 also includes a body or mass of resilient material 34 which may be bonded to the sides of the gripping jaws 22 and extends from each member to the proximate ones. Oil-resistant synthetic rubber or plastic are the suitable materials to use for this purpose. When the paltes are provided with openings 32, the resilient material passes through them. The outer and inner surfaces of the mass of material 34 lie in a cylinder parallel with the outer edges 24 and spaced inwardly from and parallel with the middle portion 28 and conical end portions 30 of the inner edges of the jaws.

The mass of resilient material 34 is molded or otherwise formed so that when it is in its normal condition it holds the gripping jaws 22 in substantially radial positions, equally spaced angularly with the distance between their opposed outer edges somewhat less than the minimum diameter of the bore of an article to be held by the collet.

In FIG. 1, the collet 10 is shown in operative working condition on a chuck 36. The chuck includes a straight cylindrical gripping body portion 44 with its outer end, the left-hand end as viewed in FIG. 1, having a flat face 45. The cylindrical body portion 44 continues into a conical or tapered portion 48 at its opposite or right-hand end. An operating or stretching rod or shaft 38 extends from the center of the end of conical portion 48, which shaft is of smaller diameter than the body portions 44 and 48, and is formed with right-hand screw threads 40 on one end, the right-hand end as shown in FIG. 1. The end having the threads 40 also is provided with a conical recess or hole 58 and the opposite end is formed with a conical recess 42 so that the tool may be held between two conical centers of the machine.

A tubular body 50 having a conical outer surface 52 is mounted on the extending portion of the shaft 38 and is adapted to be moved forwardly or rearwardly. The tubular body 50 at its larger end, the right-hand end as viewed in FIG. 1, is formed with a reduced portion 54 which portion is formed with external left-hand threads 55. A nut member 56 is provided for connecting the tubular body 50 to the shaft 38. Nut 56 is provided with a central opening having right-hand threads corresponding to and adapted to engage the threads 40 on the end of shaft 38, and with internal left-hand threads 57 on the skirt portion thereof corresponding to and adapted to engage the left-hand threads 55 on the reduced portion 54 of the tubular body 50. This arrangement of threads prevents turning of the tubular body 50 during the turning of the nut 56 but permits sliding movement of the tubular body 50 on the shaft 38.

In using the chuck, the conical surface 52 of the tubular body 50 is inserted into one end of the collet 10 and the conical body 48 is inserted into the other end of the collet. Upon manually setting up on the nut 56, the conical body 50 is moved inwardly over the shaft 38 and chuck body portion 48 pulled toward body 50 whereby the plates 22 are forced outwardly and the resilient material 34 of the collet is stretched and placed under tension thereby expanding the collet. The result is that the article such as the gear body 60 shown in FIG. 1 is held by the gripping jaws 22 even when the axis of the chuck structure is in a vertical position.

In FIG. 2, the collet 10 is shown in use with a machine operated lathe chuck 36' for holding a hollow work piece 60' having a closed end 62. In this chuck 36', the operating or stretching rod or shaft 38' has one end 63, the left-hand end, threaded into the socketed threaded end of a rod 39 forming an extension of shaft 38' and connected at its other end to mechanism (not shown) for sliding or reciprocating the extension rod 39 through the hollow shaft 41 of the lathe chuck and reciprocating the shaft 38' through the collet shaft 44', a ball bearing assembly 66 is shown interposed between the end of the shaft 44' and the end of the hollow shaft 41. A stretcher conical body 64 is carried on the other end of the shaft 38'. Upon reciprocation of the shaft 38' through the shaft 44' in one direction, the conical body 64 is drawn toward the conical portion 48 of the collet shaft 44' whereby the ends of the plates 22 ride up on the conical surfaces of the conical body 64 and the tapered portion 48 of shaft 44' so that the plates 22 are forced outwardly and radially. The resilient material is thus stretched and placed under tension thereby stretching and expanding the collet so that the work piece 60' is gripped and carried around with the shafts upon turning of the chuck lathe by conventional mechanism.

Upon reciprocation of the shaft 38' in the opposite direction, the plates 22 of the collet 10 become loosened and retracted.

A pulley 65 is shown in dot-dash lines mounted on the chuck for turning the same.

In the modification shown in FIG. 3, the collet 104 differs from the collet 10 shown in FIG. 1 in that the plates 106 are formed with spaced lugs 108 having tapering ends 110 on the outer long edges thereof. Furthermore, in place of the spaced round openings 32, the plates are formed with elongated closed slots 112 through which the material 114 extends.

In all other respects, the modified form of collet shown in FIG. 3 is similar to the form shown in FIG. 1 and similar reference numerals are used to indicate similar parts.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A collet of the kind described comprising a cylindrical body having an axial bore, said body consisting of a plurality of spaced rectangular-shaped rigid plates constituting jaws, with resilient material between the plates, each jaw provided with an elongated outer friction work-gripping surface constituted by an elongated straight edge and an elongated inner surface in the bore to cooperate with a movable operating rod for the application of expanding pressure on the jaws, said inner surface constituted by conical end edge portions and by an intermediate straight edge portion parallel to the outer straight edge, said plates having elongated closed slots to receive the resilient material for integrating the parts and having spaced lugs with tapering ends on the outer long edges thereof.

References Cited in the file of this patent
UNITED STATES PATENTS

| | | |
|---|---|---|
| 2,346,706 | Stoner | Apr. 18, 1944 |
| 2,374,245 | Stoner | Apr. 24, 1945 |
| 2,877,022 | Parker | Mar. 10, 1959 |